(12) United States Patent
Zhigang

(10) Patent No.: US 7,305,230 B2
(45) Date of Patent: Dec. 4, 2007

(54) SYSTEM, APPARATUS, AND METHOD FOR PROVIDING A MOBILE SERVER

(75) Inventor: Qu Zhigang, Beijing (CN)

(73) Assignee: Nokia Corporation, Espoo (FI)

( * ) Notice: Subject to any disclaimer, the term of this patent is extended or adjusted under 35 U.S.C. 154(b) by 212 days.

(21) Appl. No.: 10/611,647

(22) Filed: Jul. 1, 2003

(65) Prior Publication Data
US 2005/0014489 A1   Jan. 20, 2005

(51) Int. Cl.
*H04M 3/24* (2006.01)

(52) U.S. Cl. ............................ 455/414.1; 455/412.1; 455/414.2

(58) Field of Classification Search .. 455/412.1–412.2, 455/415, 414.2, 426.1, 418; 709/217
See application file for complete search history.

(56) References Cited

U.S. PATENT DOCUMENTS

| | | | |
|---|---|---|---|
| 6,292,833 B1* | 9/2001 | Liao et al. ................... | 709/229 |
| 2002/0028672 A1* | 3/2002 | Qi et al. ..................... | 455/414 |
| 2002/0090933 A1* | 7/2002 | Rouse et al. ................ | 455/412 |
| 2002/0123335 A1* | 9/2002 | Luna et al. .................. | 455/419 |
| 2002/0126708 A1* | 9/2002 | Skog et al. .................. | 370/522 |
| 2003/0027581 A1* | 2/2003 | Jokinen et al. ............. | 455/456 |
| 2003/0028612 A1* | 2/2003 | Lin et al. .................... | 709/217 |
| 2003/0035409 A1* | 2/2003 | Wang et al. ................. | 370/349 |
| 2003/0078034 A1* | 4/2003 | Tsutsumi et al. ........... | 455/412 |
| 2003/0083052 A1* | 5/2003 | Hosaka ....................... | 455/414 |
| 2003/0105864 A1* | 6/2003 | Mulligan et al. ........... | 709/225 |
| 2003/0119486 A1* | 6/2003 | Tari et al. ................... | 455/412 |
| 2004/0083114 A1* | 4/2004 | Yue ............................... | 705/1 |
| 2004/0172536 A1* | 9/2004 | Malville et al. ............ | 713/169 |
| 2005/0025300 A1* | 2/2005 | Lagadec et al. ....... | 379/201.11 |

* cited by examiner

*Primary Examiner*—Duc M. Nguyen
*Assistant Examiner*—Dai Phuong
(74) *Attorney, Agent, or Firm*—Hollingsworth & Funk, LLC

(57) ABSTRACT

Mobile terminal (302) provides information resources to other mobile terminals (310), Internet (306), and Internet browser (308). WAP push mechanisms including Session Initiation Request (SIR) and Service Loading (SL) are implemented through Wireless Access Protocol (WAP) gateway/HyperText Transfer Protocol (HTTP) proxy 304 to facilitate HTTP information transfer between mobile server (302) and the other network terminals (310 and 308).

3 Claims, 9 Drawing Sheets

SYSTEM, APPARATUS, AND METHOD FOR PROVIDING A MOBILE SERVER

FIELD OF THE INVENTION

This invention relates in general to information servers, and more particularly, to mobile information servers providing information resources as an HyperText Transfer Protocol (HTTP) server.

BACKGROUND OF THE INVENTION

The mobile communications industry has seen a virtual explosion of growth over the past decade. The mobile terminal itself has evolved from a simplistic device offering two-way voice communications, to a device that offers rich content communication capability including, for example, color pictures, audio, music, and video clips.

The catalyst for such rich content capability began with the Short Messaging Service (SMS), which is still widely used today. With SMS, users are able to transport limited types of content including text, ringing tones, and small monochrome bit map displays using a store and forward model. In particular, the SMS message is first received by a Short Messaging Service Center (SMSC), which acts as the store and forward unit. Once the recipient becomes able to receive the message, the SMSC delivers the message to the recipient without any intervention from the recipient. The Multimedia Message Service (MMS) adds to the SMS capability by facilitating the use of richer content types including image formats such as the Joint Photographic Experts Group (JPEG) and the Graphics Interchange Format (GIF) as well as audio, music, and video clips. MMS is used for rich content exchange between Web applications and mobile devices and between the Internet and mobile devices.

As the functional capabilities of the mobile terminal continue to develop, they will not only be able to download information from Web applications and the Internet, but the mobile terminal itself will become a source of information for other network components. In particular, the advanced mobile terminals available today are already capable of capturing images, creating video clips, and recording audio through the use of integrated camera and microphone resources within the mobile terminal itself. The capabilities of tomorrow's mobile terminal are restricted only by the imagination of those responsible for their design. In the near future, the mobile terminal will become an alternative form of resource storage, including storage for downloaded resources, acquired resources, locally created resources, and recreated resources, i.e., those resources created through the combination of other resource types.

Information exchange within the Internet is performed through the use of the HTTP, where an Internet Protocol (IP) address is provided to each network entity involved in the HTTP information transfer. Mobile terminals, however, are not addressed by an IP address, but are rather addressed by their Mobile Station Integrated Services Digital Network Number (MSISDN). Thus, direct transfer of information from the mobile terminal to users of the Internet via HTTP is virtually impossible.

Prior art methods of information exchange with mobile terminals require the use of a Personal Computer (PC) that is connected to the Internet. In such an instance, pictures and other information contained within the mobile terminal must first be transferred to the PC via a proximity connection such as infrared, Bluetooth, or conventional wired connections such as RS232 or RS485. Once transferred, the information must then be transferred to a Web server to enable storage and access via the Internet. Users of the Internet may then employ conventional HTTP methods to access the Web server to eventually upload the transferred information from the Web server. As such, mobile terminals today are incompatible with HTTP information exchange for several reasons.

In order to facilitate HTTP transfer of information directly from a mobile terminal to users of the Internet, several problems must be addressed. First, routing of HTTP requests to mobile terminals is a challenge due to the lack of IP address capability for mobile terminals. Mobile terminals are not assigned fixed IP addresses currently and it is expected that IP addresses for mobile terminals will not be assigned for quite some time to come. Additionally, no HTTP server functionality currently exists for mobile terminals today and the expense of providing such a function is likely to be exorbitant.

Accordingly, there is a need in the communications industry for a system, apparatus and method that allows and facilitates HTTP transfer directly to/from the mobile terminals operating within a mobile network. In addition, utilization of current technology to allow direct HTTP communication to mobile terminals should be implemented where applicable in order to reduce cost of implementation.

SUMMARY OF THE INVENTION

To overcome limitations in the prior art, and to overcome other limitations that will become apparent upon reading and understanding the present specification, the present invention discloses a system, apparatus, and method for providing a virtual server of mobile terminals. The mobile virtual server facilitates direct HTTP communication between, for example, the Internet and a mobile terminal operating within a General Packet Radio Service (GPRS) network.

In accordance with one embodiment of the invention, a method for retrieving content from a mobile terminal operating as a server within a network is provided. The method comprises receiving a request for data from the network, modifying parameters of the request to indicate that the mobile terminal is the source of the content, forwarding the modified request to the mobile terminal, and supplying content from the mobile terminal in response to the modified request.

In accordance with another embodiment of the invention, a mobile server system is provided. The mobile server system comprises a network terminal coupled to transmit a content request, a proxy coupled to receive the content request and arranged to modify the content request, and a mobile terminal coupled to the proxy to receive the modified request. The modified request indicates that the mobile terminal is operating as a mobile server to provide the requested content to the network terminal.

In accordance with another embodiment of the invention, a mobile terminal wirelessly coupled to a network which includes a network element capable of relaying modified content requests to the mobile terminal is provided. The mobile terminal comprises a memory capable of storing at least a protocol module and a server directory containing requested content, a processor coupled to the memory and configured by the protocol module to provide the requested content to the network element in response to the modified content request, and a transceiver configured to facilitate the requested content exchange with the network element. The modified content request received from the network element indicates that the mobile terminal is a server for the requested content.

In accordance with another embodiment of the invention, a computer-readable medium having instructions stored thereon which are executable by a mobile terminal for supplying content is provided. The instructions perform steps comprising receiving a content request, identifying a first parameter in the content request designating the mobile terminal as a content server, and identifying a second parameter in the content request designating a location of the content to be supplied.

In accordance with another embodiment of the invention, a proxy within a network used to facilitate content retrieval from a mobile server is provided. The proxy comprises means for receiving content requests, means for modifying the content requests, means for transmitting the modified content requests to the mobile server, and means for receiving content from the mobile server in response to the modified content request.

In accordance with another embodiment of the invention, a computer-readable medium having instructions stored thereon which are executable by a network proxy for facilitating content retrieval from a mobile server is provided. The instructions perform steps comprising receiving content requests from network elements, modifying the content requests to designate a mobile terminal as the mobile server, forwarding the modified content requests to the mobile terminal, and receiving content from the mobile terminal in response to the modified content requests.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a system, apparatus, and method for providing content contained within a mobile terminal. The mobile terminal operates as an HTTP server for other network elements using modified WAP push and HTTP procedures. A WAP gateway/HTTP proxy works in tandem with the mobile terminal by modifying the content requests received from the network to indicate that the mobile terminal is the server for the requested content.

Figure 1:
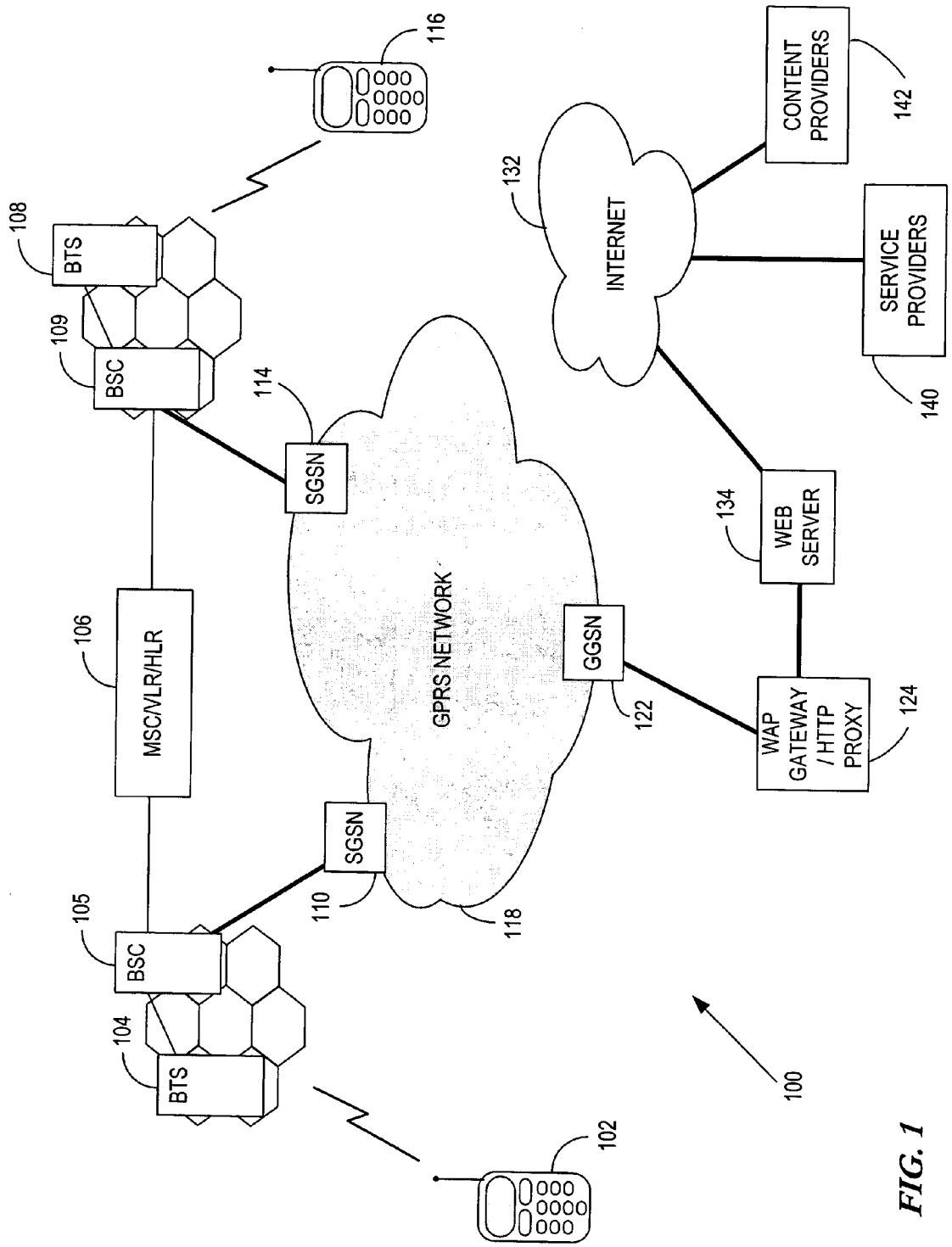
FIG. 1 illustrates and exemplary system architecture in accordance with the present invention.

FIG. 1 illustrates exemplary communication system 100 in which the principles of the present invention may be utilized. Communication system 100 utilizes General Packet Radio Service (GPRS) network 118 as the communications backbone. GPRS is a packet-switched service for the Global System for Mobile Communications (GSM) that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIG. 1 are generally described in connection with GPRS/GSM, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, 3G technologies, and beyond.

Referring to FIG. 1, mobile terminals 102 and 116 communicate with Base Transceiver Station (BTS) 104 and 108, respectively, via an air interface. BTS 104 and 108 are components of the wireless network access infrastructure that terminates the air interface over which subscriber traffic is communicated to and from mobile terminals 102 and 116. Base Station Controller (BSC) 105 and 109 are switching modules that provide, among other things, handoff functions, and power level control in each BTS 104 and 108, respectively. BSC 105 and 109 controls the interface between a Mobile Switching Center (MSC) 106 and BTS 104 and 108, and thus controls one or more BTSs in the call set-up functions, signaling, and use of radio channels. BSC 105 and 109 also controls the respective interfaces between Serving GPRS Support Node (SGSN) 110 and BTS 104 and SGSN 114 and BTS 108.

SGSN 110 and 114 serves a GPRS mobile terminal by sending or receiving packets via a Base Station Subsystem (BSS), and more particularly via BSC 105 and 109 in the context of GSM systems. SGSN 110 and 114 are responsible for the delivery of data packets to and from mobile terminals 102 and 116, respectively, within the service area, and they perform packet routing and transfer, mobility management, logical link management, authentication, charging functions, etc. In the exemplary GPRS embodiment shown in FIG. 1, the location register of SGSN 110 stores location information such as the current cell and Visiting Location Register (VLR) associated with mobile terminal 102, as well as user profiles such as the International Mobile Subscriber Identity Number (IMSI) of all GPRS users registered with SGSN 110. SGSN 114 performs similar functions relating to mobile terminal 116. While GSM forms the underlying technology, SGSN 110 and 114 described above are network elements introduced through GPRS technology. Another network element introduced in the GPRS context is the Gateway GPRS Support Node (GGSN) 122, which acts as a gateway between the GPRS network 118 and WAP gateway/HTTP proxy 124. Access to Internet 132 and corresponding service and content providers, 140 and 142 respectively, is provided to mobile terminals 102 and 116 via Web server 134.

WAP enhances the functionality of mobile terminals through real-time interactive services. The protocol has been specifically designed for small screens and low bandwidths, and it offers a wide variety of wireless services over the Internet for mobile devices. It was also designed to allow content to be delivered over any bearer service, even when delivery of the services is enabled over GPRS, 3G, or any other type of network. WAP over GPRS opens up new possibilities for application development and there are also some optimizations in GPRS that can be performed by service developers.

Application developers can use the principles of WAP to develop new services or adapt existing Internet applications for use with mobile devices. Applications are written in Wireless Markup Language (WML) and WMLScript (WMLS) and are stored on either Web server 134 or directly on WAP gateway/HTTP proxy 124. The content stored on Web server 134 is accessible from mobile devices 102 and 116 via GPRS network 118, GGSN 122, and WAP gateway/HTTP proxy 124. WAP gateway/HTTP proxy 124 is used to cache WML content whenever the content is accessed via Internet 132. WAP gateway/HTTP proxy 124 is also configured to route HTTP requests between, for example, Internet 132 and mobile terminals 102 and 116.

Figure 2:
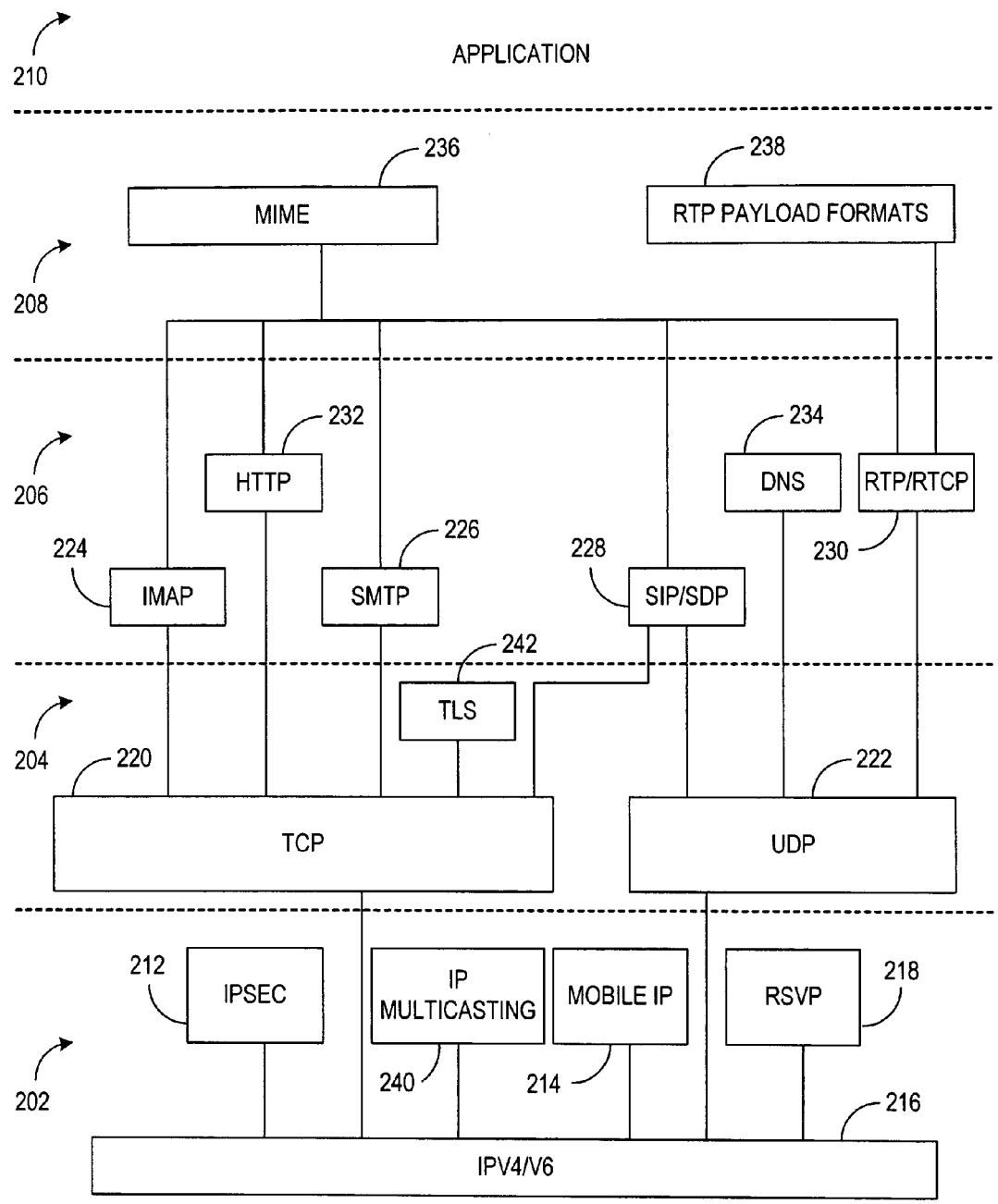
FIG. 2 illustrates an exemplary IP based protocol stack.

FIG. 2 illustrates HTTP and related protocols as they are hierarchically related within the Internet Multimedia Architecture (IMA) as defined by the Internet Engineering Task Force (IETF) to enable IP communications. Internet layer 202 resides at the bottom of the IMA layered protocol stack above the physical layer (not shown). A portion of Internet layer 202 is comprised of IP layer 216, e.g., IPv4 or IPv6, which runs over every network technology and provides the basic connectionless, packet delivery service for any layer above it. Included with the IP layer is a mobility mechanism, Mobile IP 214, which allows mobile terminals to move freely between different mobile networks. Mobile IP 214 hides the changes in the point-of-attachment to the network from the layers above. Mobile IP 214 also allows IP enabled mobile devices to receive IP packets via their home networks regardless of which network they happen to be roaming in at the time.

A multicasting agent, IP Multicasting 240, also resides within the IP layer which allows, for example, a mobile subscriber to deliver a packet simultaneously to multiple receivers, easing the scalability of large conferences or media streaming. Security is also provided within the IP layer, i.e., IPSec 212, which provides confidentiality and integrity protection for all traffic. RSVP 218 is a signaling protocol for flow state establishment. A flow is a stream of packets classified by a flow classifier where each packet is subject to a queuing policy. Each packet may be considered individually, for example, to check their conformance to the bandwidth limit associated with each packet in the packet stream.

Above the IP layer resides transport protocol layer 204, which operates end-to-end between hosts or terminals. Exemplary transport protocols include Transmission Control Protocol (TCP) 220 that allows connection-oriented reliable delivery with congestion control and retransmission for data recovery. Another transport protocol is User Datagram Protocol (UDP) 222, which allows a connectionless datagram service where connection setup is not needed or when overhead should be reduced. Another transport within transport layer 204 is the Stream Control Transmission Protocol (SCTP) (not shown) which provides connection-oriented service to multiple interfaces/IP addresses. SCTP allows multiple streams to avoid head of line blocking and is also message oriented, so that protocols running on top of SCTP do not need to worry about message alignment. Transport Layer Security (TLS) 242 provides communications privacy over connection-oriented transport protocols. TLS 242 allows one or both of the end points to be authenticated with certificates and provides key enabling encryption of all the data in the transport connection. A common use for TLS 242 and its predecessor, Secure Sockets Layer (SSL), is to secure Web transactions.

Above transport protocol layer 204 resides session protocol layer 206. HTTP 232 performs session control for browsing and enables management of transport layer connections for content transfer. The connections are addressed either to a proxy HTTP server or directly to the server identified by the host part of the Uniform Resource Locator (URL). E-mail type store and retrieve messaging sessions are managed with Simple Mail Transfer Protocol (SMTP) 226 and the Internet Message Access Protocol (IMAP) 224. Layers above transport layer 204 can utilize the Internet Domain Name System (DNS) to translate mnemonic names to numeric addresses required by those layers. Voice and other multimedia content, such as video or animation for example, are transported by Real-Time Transport Protocol/Real-Time Transport Control Protocol (RTP/RTCP) 230, which runs on top of UDP transport 222. RTP/RTCP 230 also offers synchronization of data streams it carries by including a sequence number and a timestamp header.

Session Initiation Protocol/Session Description Protocol (SIP/SDP) 228 is utilized for instant messaging and rich call session control. SIP/SDP 228 facilitates end-to-end capability negotiation for real-time multimedia communication sessions, where the real-time media is transported over RTP with the aid of RTP/RTCP 230. Addressing for SIP sessions is based on the SIP URLs. SIP user agents are reachable through their registration to the rich session control element in the home network, which is identified by the domain portion of the consumer's SIP URL. Real time transport resources are managed independently by each session participant for his or her own access network.

Presentation layer 208 comprises Multipurpose Internet Mail Extensions (MIME) 236, which defines the rules for labeling and transmission of different data types within SMTP messages and their attachments. MIME 236 also forms the basis for the transmission of streaming data, such as audio and video messages. RTP Payload Formats 238 supports grouping of payload types for specific applications, such as for audio/video conferencing. Payload types identify specific codecs, such as for Moving Pictures Expert Group Version 4 (MPEG-4) streams, or Enhanced Variable Rate Codec (EVRC) speech. Application layer 210 is situated on top of the transport and session layer protocols, providing the various mobile applications with basic application domain independent services, such as user interface, application inter-working, and service access security.

The protocol hierarchy of FIG. 2 should be largely encompassed by software architectures that are employed to facilitate internet telephony. Internet telephony consists not only of transmitting speech over packet-based networks, but also includes many other aspects of communications: easy-to-remember addressing, user and service mobility, network presence, instant messaging, and multimedia. In addition to peer-to-peer communications, seamless integration with Web browsing and real-time multimedia streaming are needed for a rich user experience.

Utilization of WAP gateway/HTTP proxy 124 allows mobile terminals 102 and 116 to provide an information resource to other users of Internet 132 or other mobile terminals within the network. According to the principles of the present invention, the mobile terminal providing the information resource acts as an HTTP server, whereby other mobile terminals or Internet browsers operating within Internet 132 may access information from mobile terminals operating as HTTP clients through the use of HTTP. The user of a mobile terminal operating as an HTTP server, for example, may publish an information resource such as a home page in WML or extensible HyperText Markup Language (XHTML), or other information resources such as image or video content, and may further define access controls to the information resource.

Figure 3:
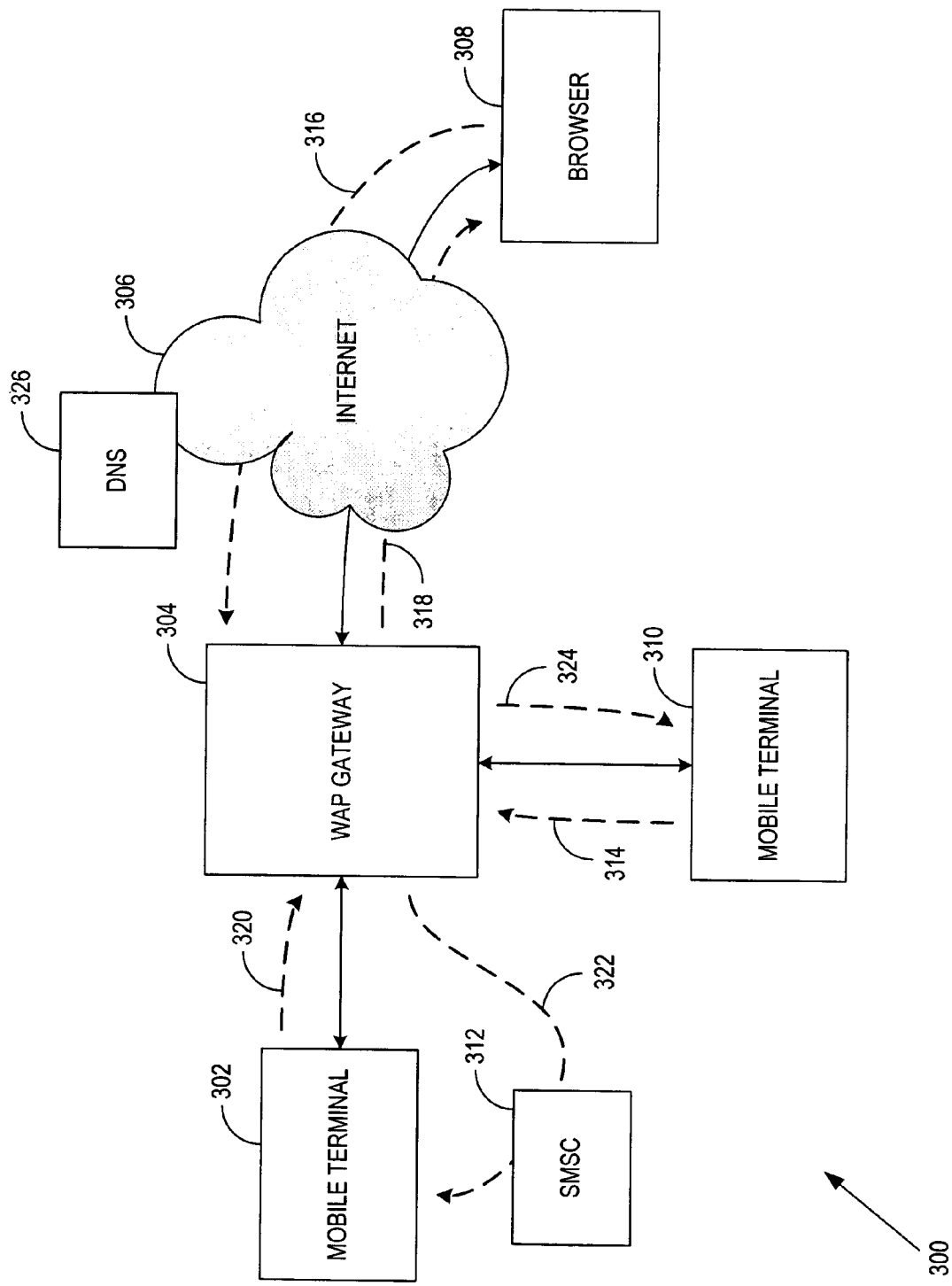
FIG. 3 illustrates a mobile server relationship in accordance with the present invention.

FIG. 3 illustrates mobile server relationship 300 in accordance with the principles of the present invention. Mobile terminal 302, for example, may be operating as an HTTP server, whereby mobile terminal 310 and browser 308 are able to access information resources stored within mobile terminal 302 via WAP gateway 304. With reference to FIG. 1, mobile terminal 302 may correspond to mobile terminal 102, WAP gateway 304 may correspond to WAP gateway/HTTP proxy 124, and Internet 306 corresponds to Internet 132. Browser 308 corresponds to any IP enabled device capable of accessing Internet 306 using HTTP requests.

An HTTP request message is generated by a client, e.g., browser 308, and is delivered to a server, e.g., mobile terminal 302, in accordance with the principles of the present invention. The components of the HTTP request message are illustrated in Table 1, where included within the first line of the request message is the Request-Line, which defines the method to be applied to the resource, the Uniform Resource Identifier (URI) of the resource, and the protocol version in use. The method tag includes values: "OPTIONS"; "GET"; "HEAD"; "POST"; "PUT"; "DELETE"; "TRACE"; and "CONNECT". The "GET" method retrieves whatever information (in the form of an entity) that is identified

TABLE 1

| Request Message | Description |
|---|---|
| request-line | Contains the method, request-URI, and the HTTP Version |
| general-header | General applicability to request and response messages |
| request-header | Allows client to pass additional information about request |
| entity-header | Defines meta information about the entity body |
| message-body | Carries the entity body associated with the request | by the Request-URI. If the Request-URI refers to a data-producing process, for example, it is the produced data which is returned as the entity in the response and not the source text of the process, unless the source text happens to be the output of the process. The "POST" method is used to request that the origin server accept the entity enclosed in the request as a new subordinate of the resource identified by the Request-URI in the Request-Line. "POST" is designed to allow a uniform method to cover the following functions: annotation of existing resources; posting a message to a bulletin board, newsgroup, mailing list, or similar group of articles; providing a block of data, such as the result of submitting a form to a data-handling process; or extending a database through an append operation. The actual function performed by the POST method is determined by the server and is usually dependent on the Request-URI. The posted entity is subordinate to that URI in the same way that a file is subordinate to a directory containing it, a news article is subordinate to a newsgroup to which it is posted, or a record is subordinate to a database.

There are a few header fields which have general applicability for both request and response messages, but which do not apply to the entity being transferred. These header fields apply only to the message being transmitted and they are found in the general-header field of the HTTP request message. The request-header field allows the client to pass additional information about the request, and about the client itself, to the server. These fields act as request modifiers, with semantics equivalent to the parameters on a programming language method invocation. Entity-header fields define meta information about the entity-body or, if no body is present, about the resource identified by the request. Some of the meta information is optional and some might be required by portions of the particular HTTP version being used.

The message-body (if any) of an HTTP message is used to carry the entity-body associated with the request or response. The message-body differs from the entity-body only when a transfer-coding has been applied, as indicated by the Transfer-Encoding header field (not shown). Transfer-Encoding must be used to indicate any transfer-coding applied by an application to ensure safe and proper transfer of the message. Transfer-Encoding is a property of the message, not of the entity, and thus may be added or removed by any application along the request/response chain. The presence of a message-body in a request is signaled by the inclusion of a Content-Length or Transfer-Encoding header field in the request's message-headers. A message-body must not be included in a request if the specification of the request method does not allow sending an entity-body in requests. A server should read and forward a message-body on any request; if the request method does not include defined semantics for an entity-body, then the message-body should be ignored when handling the request.

An exemplary HTTP request line using the "GET" tag according to the prior art is illustrated in request line (1):

GET http://www.w3.org/pub/WWW/TheProject.html
HTTP/1.1          (1)

The request line includes the familiar URI pathname, "http://www.w3.org/pub/WWW/", and the file "TheProject.html" is to be retrieved as a result of the "GET" request from the URI. Mobile terminals, however, do not have an IP address or a URI associated with them. Therefore, HTTP GET request-line (1) is not compatible with, for example, mobile terminal 302, when content is desired to be retrieved from mobile terminal 302.

In accordance with the present invention, the proposed URI pathname used in an HTTP GET request from either of browser 308 or mobile terminal 310, for example, takes the form of "http://identifier" or "http: identifier.domain-name". The "identifier" portion of the URI pathname reflects the MSISDN of mobile terminal 302 and the "domain-name" portion of the URI pathname reflects the domain name of WAP gateway 304 in the operator network. The "domain-name" portion of the URI pathname may be omitted, for example, when mobile terminal 310 is in the same operator network as mobile terminal 302. The HTTP request message may be delivered via path 316 from browser 308 or via path 314 from mobile terminal 310. Domain Name Server (DNS) 326 may be utilized to convert the domain name contained within the URI pathname to the actual IP address of WAP gateway 304. For example, the following wildcard entry may be used to facilitate the conversion from the URI pathname provided by browser 308, for example, to the IP address of WAP gateway 304:

"*.wap.sonera.net A1.2.3.4"

The "*" is a wildcard that allows all request lines having URI pathnames that contain domain portions equal to "wap.sonera.net" to be routed to WAP gateway 304, since IP address 1.2.3.4 is supplied by DNS 326 in response to domain requests for "wap.sonera.net".

After receiving the HTTP requests, WAP gateway 304 replaces the URI pathname of the HTTP request with "httpserver" and then proxies the request to mobile terminal 302 through SMSC 312 via path 322. In addition, WAP gateway 304 also sends the MSISDN of mobile terminal 310 (in the event that the HTTP request was received from mobile terminal 310) to mobile terminal 302 for authentication and authorization of mobile terminal 310. If, on the other hand, the HTTP request was received from browser 308, then WAP gateway 304 checks to see whether an HTTP Authorization header is included. If not, WAP gateway 304 will send a response with status 401 UNAUTHORIZED to browser 308, and will include a WWW-Authenticate header field containing a challenge asking for a user password from browser 308.

Once the HTTP Authorization header is received from browser 308, WAP gateway 304 forwards it to mobile terminal 302 for authentication. Since mobile terminal 302 is acting as the virtual server, it first checks the access rights of the requesting terminal. If the requesting terminal is authenticated, mobile terminal 302 forwards the content indicated by the Request-URI to WAP gateway 304 via message 320. WAP gateway 304 then encapsulates the content received from mobile terminal 302 into an HTTP response and transmits the HTTP response to the requesting terminal via either path 318 or 324. The user of mobile terminal 302 is not necessarily involved with the data access process, but sets the access rights control rules for the information resources being provided. The implementations of the access control rules are dependent upon the particular mobile terminal in use.

Data access from mobile terminal 302 may be performed in a number of different ways by using the WAP push architecture. The WAP push architecture allows a Push Proxy Gateway (PPG), e.g., WAP gateway 304, to send data to a terminal in an asynchronous manner. WAP gateway 304 and mobile terminal 302 communicate using the Push Over The Air (OTA) protocol, which utilizes either Wireless Session Protocol (OTA-WSP) and/or HTTP (OTA-HTTP) services. Connection oriented push requires some point to point connectivity, e.g., a push session if OTA-WSP is used or a TCP connection if OTA-HTTP is used, before the push content can be delivered. Connectionless push is usually always performed using WSP/Wireless Datagram Protocol (WDP).

It is possible, however, that since the WAP push architecture is asynchronous by nature, that no push session exists, e.g., OTA-WSP, that no TCP connection has been established, e.g., OTA-HTTP, or that the desired bearer is not utilized when content is about to be pushed to mobile terminal 302 from WAP gateway 304. The Session Initiation Application (SIA) executing within mobile terminal 302, therefore, allows WAP gateway 304 to establish either a push session or a TCP connection via a specific bearer, such as SMS supported by SMSC 312. The process of sending SIA content to a mobile terminal is referred to as a Session Initiation Request (SIR).

In one embodiment according to the present invention, contents from a server terminal, e.g., mobile terminal 302, may be fetched by using an SIR of the WAP Push architecture. After receiving an HTTP GET request from a client terminal, for example, WAP gateway 304 must then retrieve the contents requested by the HTTP GET request from mobile terminal 302. WAP gateway 304 then sends an SIR to mobile terminal 302 via SMSC 312, to instruct mobile terminal 302 to establish a TCP connection with WAP gateway 320. Mobile terminal 302 should be an IP equipped mobile terminal running, for example, the IP stack of FIG. 2. WAP gateway 304 then uses an HTTP POST procedure with a modified URL to supply mobile terminal 302 with the identification of the requesting client. In the event that the requesting client is mobile terminal 310, for example, WAP gateway 304 attaches the MSISDN of mobile terminal 310 in a user header extension, e.g., X-<user> MSISDN HTTP header. The <user> portion of the user header identifies the header as a non-X-WAP header, such that the header will not be registered with the WAP Interim Naming Authority (WINA). On the other hand, if the requesting client is browser 308, WAP gateway 304 attaches the authorization HTTP header sent from browser 308 in order to validate the requesting client.

Figure 4:
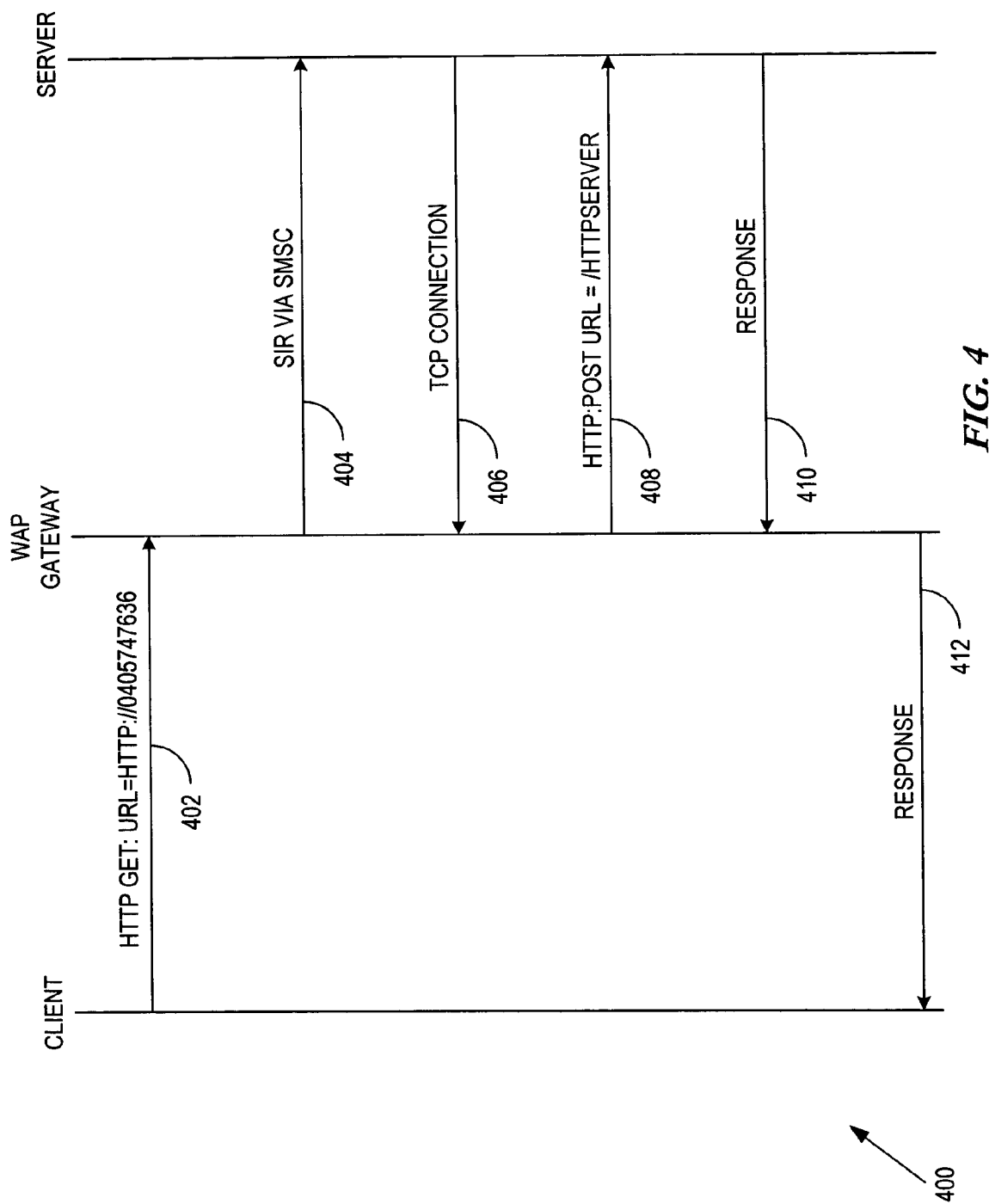
FIG. 4 illustrates an exemplary message flow diagram in accordance with the present invention.

Message flow diagram 400 of FIG. 4 illustrates the fetching of contents from a mobile terminal acting as a virtual HTTP server by using an SIR in accordance with the present invention. Message 402, for example, is an HTTP GET message whereby the URL is designated as "URL=HTTP://0405747636". The "0405747636" portion of the URL designates the MSISDN of the mobile terminal HTTP server, e.g., mobile terminal 302. Message 402 may be transmitted by either of browser 308 or mobile terminal 310 via paths 316 or 314, respectively, where the domain portion of the URL, e.g., wap.sonera.net, may be omitted when the client terminal and server terminal are within the same network.

Message 404 represents a SIR message used by WAP gateway 304 to request a TCP connection between WAP gateway 304 and mobile terminal 302. Within the SIR message, contact points may be identified by WAP gateway 304 to mobile terminal 302 that provides mobile terminal 302 with PPG addresses, or ports, that may be used by mobile terminal 302 to establish the TCP connection. The ports may also be provisioned ports (ProvP) or one of the registered push ports (RegP). Mobile terminal 302 then uses the PPG addresses to create the TCP connection to WAP gateway 304 as in message 406. Mobile terminal 302 uses the Terminal Originated TCP (TO-TCP) method to establish the TCP connection, which creates the ability within mobile terminal 302 to receive HTTP requests from WAP gateway 304.

In message 408, WAP gateway 304 issues an HTTP POST request to mobile terminal 302 using "/httpserver" as the URL. Since "/httpserver" is used as the URL, mobile terminal 302 construes the request as being a request for content contained within the mobile terminal's default HTTP server directory. For example, if the HTTP POST request contained a URL equal to "/httpserver/index.wml", then mobile terminal 302 locates the file named "index.wml" within its default HTTP server directory and attaches file "index.wml" to response message 410. The default HTTP server directory may be mobile terminal implementation dependent. Additionally, the HTTP POST request of message 408 may also indicate a path such as "/httpserver/image/img.jpg" as the target fetch directory. In this case, WAP gateway 302 has requested a JPEG image file named "img.jpg" that exists in the folder named "image" in the default HTTP server directory. Finally, WAP gateway 304 encapsulates the file received from the server terminal into HTTP response message 412 in response to HTTP GET message 402. It should be noted that SIR invocation of a TCP connection is appropriate when the server terminal supports both TCP and HTTP, however, other methods are contemplated by the present invention for server terminals without such capability.

In another embodiment, for example, the Service Loading (SL) content type is used to fetch contents from mobile terminal 302 acting as a server without TCP or HTTP support. The SL content type is modified according to the principles of the present invention to include an additional action type of "httpserver", or in other words, "action=httpserver". Use of the "href" field specifies the location within the mobile terminal from which the contents are to be retrieved, e.g., "href=/httpserver/image/img.jpg". In addition, two other fields, e.g., username and password, are used to implement an authentication/authorization function. After receiving the SL, the server terminal uses either WSP, or if available, HTTP POST, to send the requested contents to WAP gateway 302.

Figure 5:
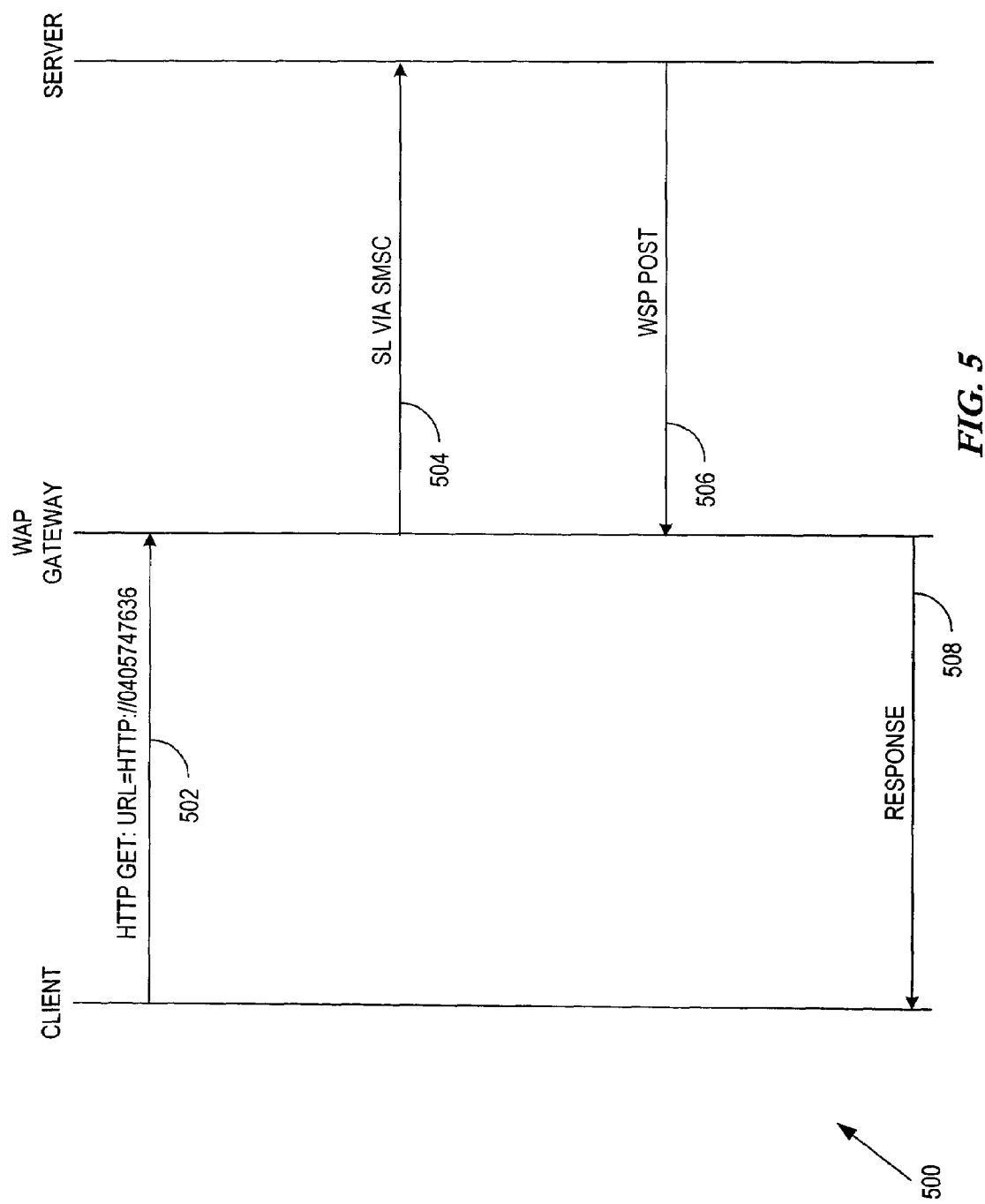
FIG. 5 illustrates an alternate message flow diagram in accordance with the present invention.

In particular, message transfer 500 of FIG. 5 illustrates an exemplary message flow using SL content to fetch contents from a server terminal. Message 502, for example, is an HTTP GET message whereby the URL is designated as "URL=HTTP://0405747636". The "0405747636" portion of the URL designates the MSISDN of the mobile terminal HTTP server, e.g., mobile terminal 302. Message 502 may be transmitted by either of browser 308 or mobile terminal 310 via paths 316 or 314, respectively, where the domain portion of the URL, e.g., wap.sonera.net, may be omitted when the client terminal and server terminal are within the same network.

Message 504 represents SL content transmitted to mobile terminal 302, wherein a new action type, e.g., httpserver, is used to invoke a content fetch from mobile terminal 302 and other fields are used for authentication/authorization. Table 2 illustrates exemplary fields of the SL content used to facilitate such a content fetch.

TABLE 2

| FIELD | VALUE |
| --- | --- |
| action | httpserver |
| href | /httpserver |
| username | MSISDN (or username) |
| password | ***** (if username is not MSISDN) |

The "action" field having value "httpserver" indicates to mobile terminal 302 that contents contained within mobile terminal 302 are being requested by a client terminal. The "href" field indicates the location of the requested contents, wherein an href value of "/httpserver" indicates that the default HTTP server directory is to be used. Alternately, other path names may be used to indicate folder locations within the default HTTP server directory, such as "/httpserver/image/img.jpg", which specifies that file "img.jpg" may be found in the "image" directory that is contained within default HTTP server directory "/httpserver". The field "username" is used for authentication/authorization purposes, whereby the value of "username" may be the MSISDN of the requesting mobile terminal, or any other username that may have been selected by the requesting terminal. If "username" is not equal to the MSISDN of the requesting terminal, then field "password" may contain a user selectable value used by the server terminal to validate the requesting terminal.

Once message 504 has been received and authenticated by mobile terminal 302, mobile terminal 302 uses a WSP POST procedure, or alternately an HTTP POST procedure if available, to deliver the content indicated by the "href" field of Table 2 to WAP gateway 304 in message 506. Finally, response 508 is delivered by WAP gateway 304 to the client terminal in response to HTTP GET message 502.

Figure 6:
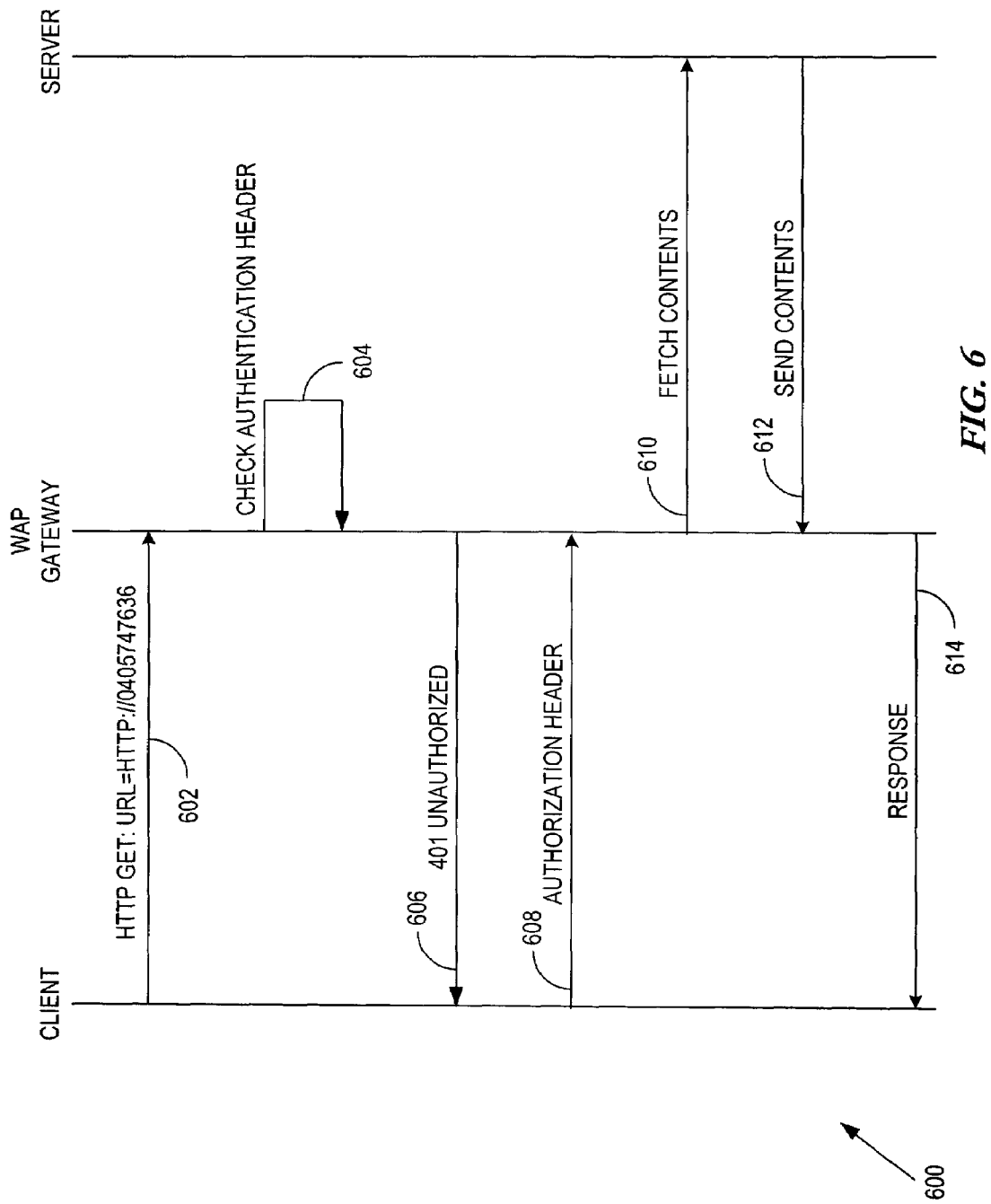
FIG. 6 illustrates an alternate message flow diagram in accordance with the present invention.

In another embodiment, browser 308 may request content contained within mobile terminal 302 using an HTTP request as illustrated in message transfer 600 of FIG. 6. The authentication header of the request is checked in step 604. If an HTTP authorization header is not included in HTTP request 602, then WAP gateway 304 sends a 401 UNAUTHORIZED response in message 606 to browser 308 containing a WWW-Authenticate header field as described in Table 3. Server terminal 302 may have several protected domains and, therefore, the realm field specifies the challenge for the specific protected domain within server terminal 302. The realm value cannot be excluded because the browser's credentials are based on it. The optional domain field specifies each URI that is a party to the specific protected domain within server terminal 302. The nonce value specifies the current challenge. The format of the nonce value is implementation dependant with the restriction that it should be unique. The nonce value is effective against replay attacks when used in conjunction with the stale parameter. In such an instance, if the nonce value is changed for each new request, then the stale parameter may be set to indicate a rejected message due to a stale nonce value. The algorithm parameter is an optional parameter which may be used to specify which algorithm is to be used for checksum calculations, e.g., Message Digest 5 (MD5). The qop-options parameter is optional depending upon backward compatibility with older versions of Digest authentication. It should be used, however, because it provides mutual authentication and some message integrity protection. The mutual

TABLE 3

| NAME OF PARAMETER | DESCRIPTION |
| --- | --- |
| realm | String associated with the protection domain. |
| domain (optional) | List of URIs that define the protection domain. |
| nonce | Unique string that is created by the WAP gateway for each 401 response. |
| opaque (optional) | A string of data specified by the WAP gateway which should be returned by the client unchanged. |
| stale (optional) | A flag that specifies if the previous request from the client is rejected because the nonce was stale. |

TABLE 3-continued

| NAME OF PARAMETER | DESCRIPTION |
| --- | --- |
| algorithm (optional) | Specifies the algorithm to use for the checksum calculations. |
| qop-options (optional) | Specifies the quality of protection that the WAP gateway supports. It can either be "auth-int" or "auth" depending on the WAP gateway's capabilities. |
| auth-param (optional) | Future extensions. | authentication means that the server terminal also has to verify that it knows the username and password for browser 308. If the qop-options="auth-int", then both authentication and message integrity protection is used. If the value is "auth", then only authentication is used.

When browser 308 receives the 401 UNAUTHORIZED challenge via message 606, it uses its password and some of the parameters contained within the WWW-Authenticate header field to calculate the checksum. The checksum is then included in the response portion of the Authorization header field of message 608 as illustrated in Table 4.

TABLE 4

| NAME OF PARAMETER | DESCRIPTION |
| --- | --- |
| username | Client's username for specified realm to be used in conjunction with auth-param below. |
| realm | String associated with the protection domain. Must contain the same value as the realm value of the 401 UNAUTHORIZED response from WAP gateway. |
| nonce | Unique string that is created by the WAP gateway for each 401 response. Should contain that same value as the nonce value in the 401 response from the WAP gateway. |
| digest URI | The URI from the request URI of the request line. |
| response | The calculated checksum that is hexadecimal encoded. |
| algorithm (optional) | Specifies the algorithm to use for the checksum calculations. |
| cnonce (optional) | If the qop-options in the received 401 response is not empty, this value is used by the WAP gateway to authenticate itself to the browser by using the Authentication-Info header field. The value is generated by the client and it should be unique. If the qop-options is empty in the received 401 response, then this value must not be used. |
| opaque (optional) | A string of data specified by the WAP gateway that should be returned by the browser unchanged. |
| message-qop (optional) | Specifies the quality of protection that the browser has applied to the message. It must be equal to one of the qop-options values specified in the 401 response from the WAP gateway. |
| nonce count (optional) | Specifies the number of requests that have used the nonce specified in this header field. |
| auth-param | Password to be used in conjunction with username above. |

Fetch contents message 610 and send contents 612 may be implemented using either of the SIR or SL based WAP methods discussed above. The response to the HTTP GET request is then provided by message 614.

Figure 7:
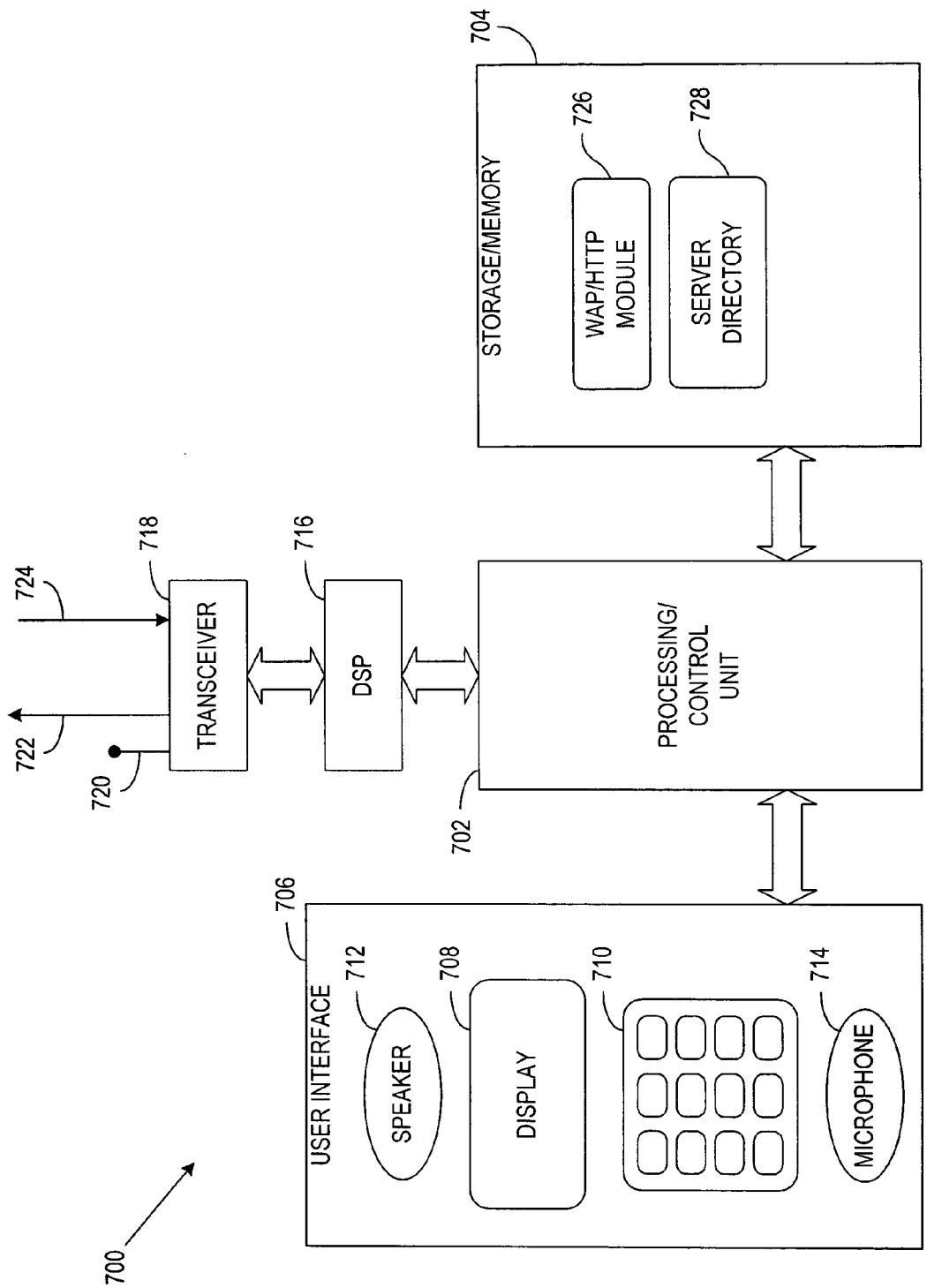
FIG. 7 illustrates a representative mobile computing arrangement suitable for performing mobile server functions in accordance with the present invention.

The invention is a modular invention, whereby processing functions within either a mobile terminal or WAP gateway/ HTTP proxy may be utilized to implement the present invention. The mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various mobile server functions described herein. An example of a representative mobile terminal computing system capable of carrying out operations in accordance with the invention is illustrated in FIG. 7. Those skilled in the art will appreciate that the exemplary mobile computing environment 700 is merely representative of general functions that may be associated with such mobile devices, and also that landline computing systems similarly include computing circuitry to perform such operations.

The exemplary mobile computing arrangement 700 suitable for implementing mobile server functions in accordance with the present invention may be associated with a number of different types of wireless devices. The representative mobile computing arrangement 700 includes a processing/ control unit 702, such as a microprocessor, reduced instruction set computer (RISC), or other central processing module. The processing unit 702 need not be a single device, and may include one or more processors. For example, the processing unit may include a master processor and associated slave processors coupled to communicate with the master processor.

The processing unit 702 controls the basic functions of the mobile terminal, and also those functions associated with the present invention as dictated by WAP/HTTP module 726 and server directory 728 available in the program storage/ memory 704. Thus, the processing unit 702 is capable of supplying mobile server content stored in server directory 728 to requesting client terminals via WAP/HTTP protocols implemented by WAP/HTTP module 726. The program storage/memory 704 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the present invention, the program modules associated with the storage/memory 704 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 700 via data signals, such as being downloaded electronically via one or more networks, such as the Internet and an intermediate wireless network(s).

The processor 702 is also coupled to user-interface 706 elements associated with the mobile terminal. The user-interface 706 of the mobile terminal may include, for example, a display 708 such as a liquid crystal display, a keypad 710, speaker 712, and microphone 714. These and other user-interface components are coupled to the processor 702 as is known in the art. Other user-interface mechanisms may be employed, such as voice commands, switches, touch pad/screen, graphical user interface using a pointing device, trackball, joystick, or any other user interface mechanism.

The mobile computing arrangement 700 also includes conventional circuitry for performing wireless transmissions. A digital signal processor (DSP) 716 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 718, generally coupled to an antenna 720, transmits the outgoing radio signals 722 and receives the incoming radio signals 724 associated with the wireless device.

The mobile computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a mobile server system, apparatus, and method in accordance with the present invention.

Figure 8:
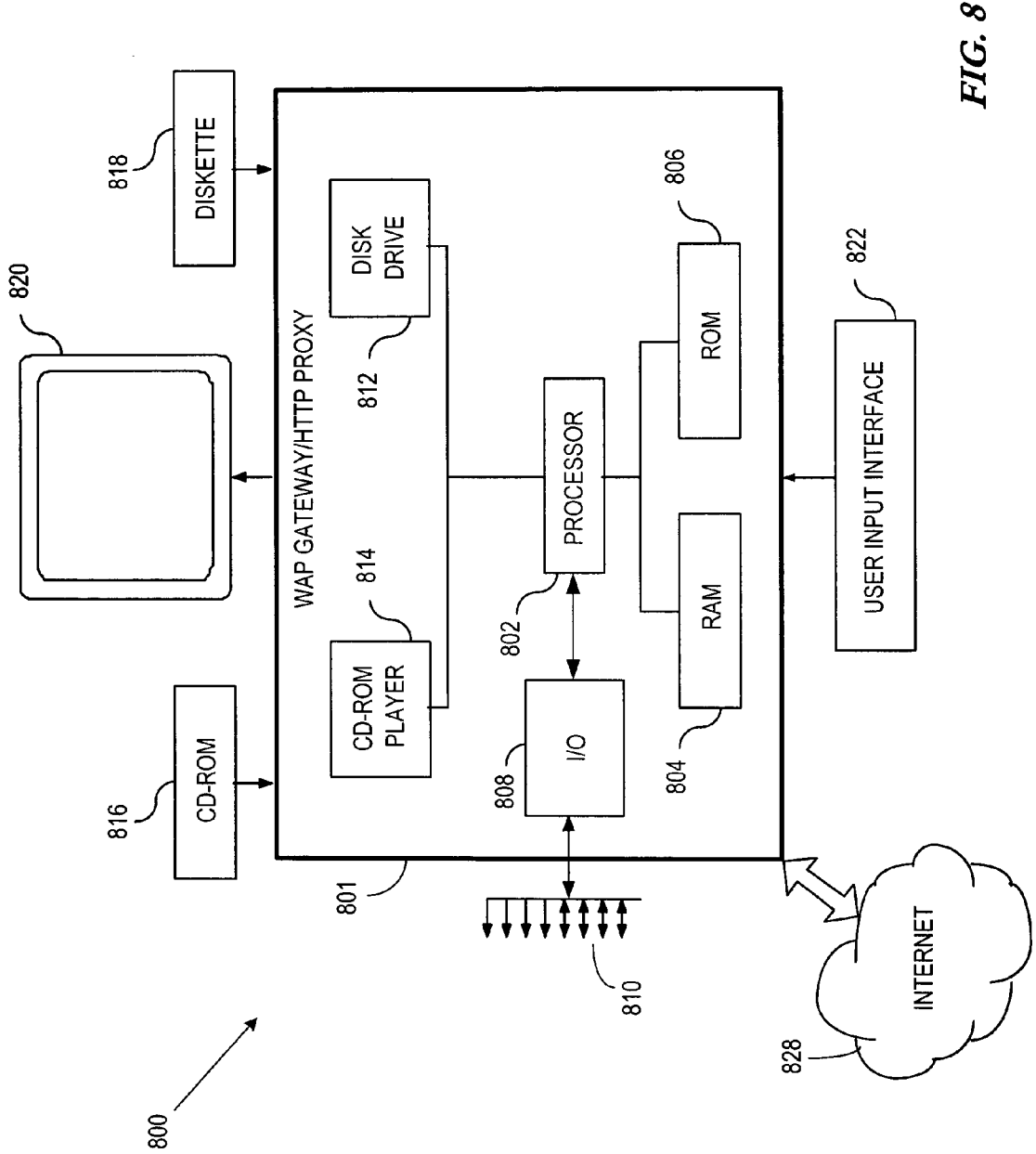
FIG. 8 is a representative computing system capable of carrying out WAP gateway/HTTP proxy functions according to the present invention.

The network servers or other systems for providing WAP/HTTP proxy functions in connection with the present invention may be any type of computing device capable of processing and communicating digital information. The network servers utilize computing systems to control and manage the mobile server access activity. An example of a representative computing system capable of carrying out operations in accordance with the invention is illustrated in FIG. 8. Hardware, firmware, software or a combination thereof may be used to perform the various WAP/HTTP proxy functions and operations described herein. The computing structure 800 of FIG. 8 is an example computing structure that can be used in connection with such a mobile server system.

The example computing arrangement 800 suitable for facilitating the mobile server activity in accordance with the present invention includes WAP gateway/HTTP proxy 801, which includes a central processor (CPU) 802 coupled to random access memory (RAM) 804 and read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. External data storage devices, such as DNS or location servers, may be coupled to I/O circuitry 808 to facilitate mobile server functions according to the present invention. Alternatively, such databases may be locally stored in the storage/memory of the WAP gateway/HTTP proxy 801, or otherwise accessible via a local network or networks having a more extensive reach such as the Internet 828. The processor 802 carries out a variety of functions as is known in the art, as dictated by software and/or firmware instructions.

WAP gateway/HTTP proxy 801 may also include one or more data storage devices, including hard and floppy disk drives 812, CD-ROM drives 814, and other hardware capable of reading and/or storing information such as DVD, etc. In one embodiment, software for carrying out the mobile server operations in accordance with the present invention may be stored and distributed on a CD-ROM 816, diskette 818 or other form of media capable of portably storing information. These storage media may be inserted into, and read by, devices such as the CD-ROM drive 814, the disk drive 812, etc. The software may also be transmitted to WAP gateway/HTTP proxy 801 via data signals, such as being downloaded electronically via a network, such as the Internet. WAP gateway/HTTP proxy 801 is coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The WAP gateway/HTTP proxy 801 may be coupled to other computing devices, such as the landline and/or wireless terminals via a network. The server may be part of a larger network configuration as in a global area network (GAN) such as the Internet 828, which allows ultimate connection to the various landline and/or mobile client/watcher devices.

Figure 9:
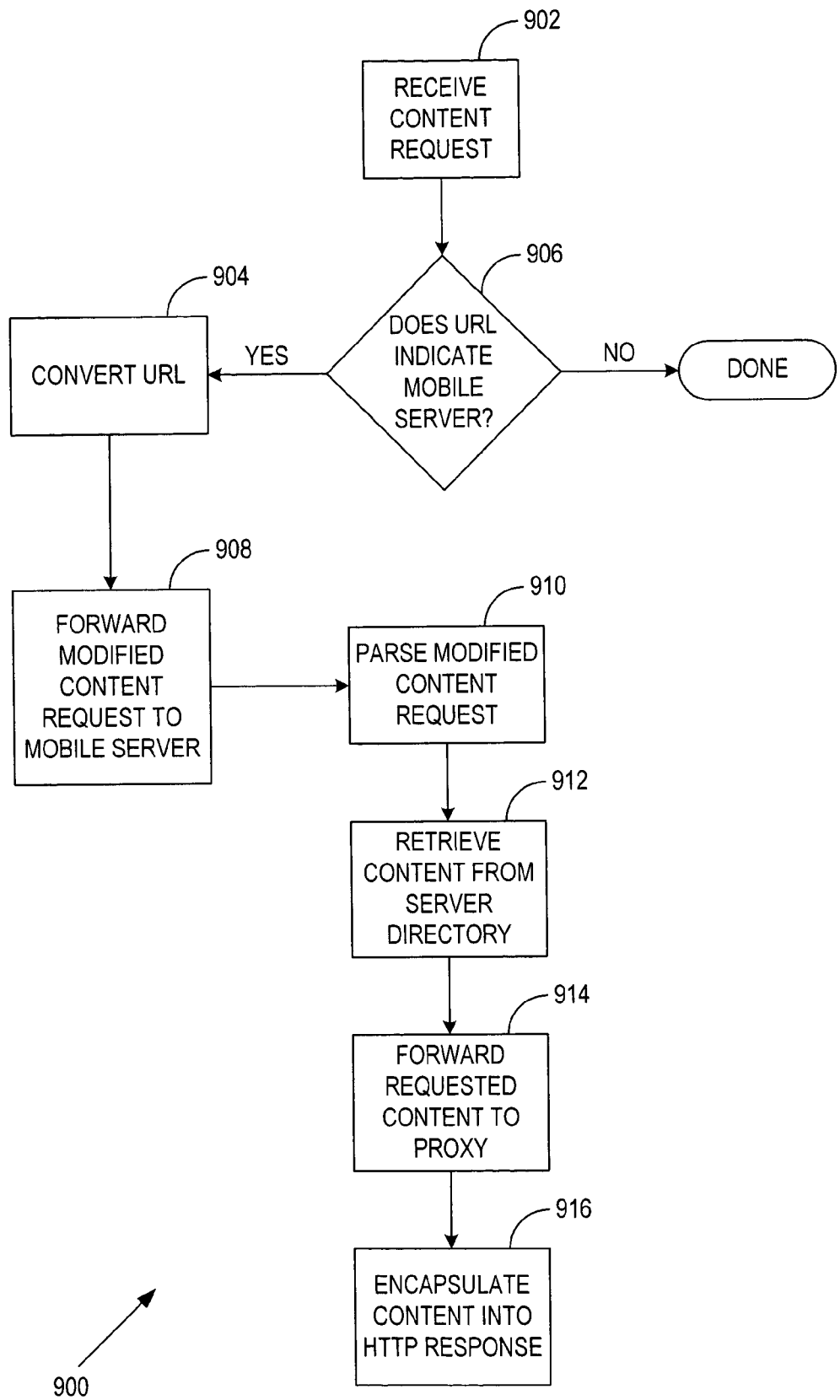
FIG. 9 illustrates an exemplary flow diagram in accordance with the present invention.

FIG. 9 illustrates exemplary content request flow diagram 900, demonstrating a content request issued from within network 300 of FIG. 3, for example, according to the present invention. In step 902, a content request is received by WAP gateway 304 from either mobile terminal 310 or browser 308 via Internet 306. WAP gateway 304 then parses the content request for the URL provided within the request. If the URL takes on the form "http://MSISDN", then the YES path of step 906 is taken, otherwise the NO path is taken and the flow terminates. The MSISDN in the URL may indicate, for example, that mobile terminal 302 is the mobile server hosting the content requested.

At step 904, the URL is converted from the form "http://MSISDN" to the form "/httpserver" by WAP gateway 304 and is then forwarded to mobile terminal 302 in step 908 via one of several WAP push procedures including SIR and SL. Once the modified content request is received by mobile terminal 302, it is parsed in step 910 to determine the path to the requested content contained within mobile terminal 302. Once the path is determined, mobile terminal 302 retrieves the content pointed to by the path name as in step 912 and forwards the content to WAP gateway 304 as in step 914. Once the content has been received, WAP gateway 304 encapsulates the content into an HTTP response and directs it to the requesting device.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method for retrieving content via a first network from a mobile terminal operable as a server within a second network, wherein devices operable on the second network lack fixed addresses for receiving requests from the first network, the method comprising:
    receiving a request for data from the first network, the request including a destination path that includes an identifier that is addressable on the first network and a mobile terminal identifier of the mobile terminal;
    modifying the destination path of the request to indicate that a network path of the second network corresponding to the mobile terminal is the source of the content;
    modifying the request to indicate that the mobile terminal is operating as a mobile server to provide the requested data;
    forwarding the modified request to the mobile terminal; and
    supplying content from the mobile terminal in response to the modified request;
    wherein forwarding the modified request to the mobile terminal comprises using a Service Loading (SL) content type, and wherein the SL content type comprises:
    an action field indicating that the mobile terminal is a data server;
    a pathname that indicates where the content is located within the mobile terminal;
    a username to identify the requesting network element; and
    a password associated with the username.

2. The method according to claim 1, wherein the username includes the MSISDN of the requesting terminal.

3. A mobile server system, comprising:
    a first network and a second network, wherein devices operable on the second network lack fixed addresses for receiving requests from the first network;
    a network terminal coupled to transmit a content request via the first network targeted for a destination device on the second network, the request including a destination path having an identifier that is addressable on the first network and a mobile terminal identifier of the destination device;
    a proxy coupled to receive the content request and arranged to modify the destination path of the content request to indicate a network path of the second network corresponding to the destination device; and
    a mobile terminal coupled to the proxy to receive the modified request and service the request using the network path of the second network, wherein the modified request indicates that the mobile terminal is operating as a mobile server to provide the requested content to the network terminal;
    wherein the WAP procedure includes a Service Loading (SL) content type, and wherein the SL content type comprises:
    an action field indicating that the mobile terminal is a data server;
    a pathname that indicates where the content is located within the mobile terminal;
    a username to identify the network element; and
    a password associated with the username.

* * * * *